May 30, 1939.  R. G. SAGEBEER  2,160,603
COMPAROMETER
Filed Sept. 1, 1937  8 Sheets-Sheet 1

Inventor
Richard G. Sagebeer,
By Albert T. St Clair
Attorney

May 30, 1939.   R. G. SAGEBEER   2,160,603
COMPAROMETER
Filed Sept. 1, 1937    8 Sheets-Sheet 2

Inventor
Richard G. Sagebeer,
By Albert T. St Clair
Attorney

May 30, 1939.  R. G. SAGEBEER  2,160,603
COMPAROMETER
Filed Sept. 1, 1937  8 Sheets-Sheet 3

Inventor
Richard G. Sagebeer,
By Albert T. St Clair
Attorney

May 30, 1939.  R. G. SAGEBEER  2,160,603
COMPAROMETER
Filed Sept. 1, 1937  8 Sheets-Sheet 4

Inventor
Richard G. Sagebeer
By Albert T. St Clair

May 30, 1939.                R. G. SAGEBEER                2,160,603
                              COMPAROMETER
                          Filed Sept. 1, 1937          8 Sheets-Sheet 8

Inventor
Richard G. Sagebeer,

By Albert T. St Clair
                    Attorney

Patented May 30, 1939

2,160,603

UNITED STATES PATENT OFFICE 2,160,603

COMPAROMETER

Richard G. Sagebeer, Wilmington, Del.

Application September 1, 1937, Serial No. 161,916

8 Claims. (Cl. 88—14)

This invention relates to the art of apparatus for comparing statistical data.

The general uses of apparatus of the type to which the present invention relates, which will herein be called a comparometer, depend upon its property of computing quickly an index of closeness of fit between groups of numerical data.

The groups of data must have the same number of measures, i. e., certain variables must be chosen upon which to compare the groups. These variables are kept in the same order in all measurements, so that a certain value of the third variable, e. g., will always be compared with a certain other value of the same third variable. Each group of data gives a profile characteristic of the group.

In practice, each group of data may be compared in turn with every other group under consideration. This would be prohibitive without a means for making the comparisons very rapidly, as my comparometer does. When all the indices of closeness of fit have been determined, the groups may be divided into as many or as few classes as desired, depending upon the degree of closeness of fit which has been chosen as close enough for allowing two groups to be classified together. Each class will then contain only groups having similar profiles.

In some cases these classifications will be valuable at once, if the only desideratum is an unambiguous classification. In other cases the classes will have to be established, and then each class will have to be studied to determine its unique properties. When this has finally been done, and a new group appears which has the approximate profile of one of these recently established classes, that new group will presumably have the same, or nearly the same, properties as the class to which it belongs.

A few examples of classifications where the classification itself is the primary consideration are: large files of photographs in a rogues' gallery, large files of characteristic physical measurements such as are used to identify criminals, large files of census data, or any large body of groups of numbers which are to be classified and catalogued according to the "pattern" or profile of the numbers in a group.

A few examples of the second type of classification would be: educational measurements where a number of different measures are available for each individual student, vocational data, diagnostic measures in the study of mental aberrations, meteorological data, numerical indices of economic or financial trends, or any scientific measures which are complex and in which a number of numerical criteria have been applied to each one of a number of individual cases, and where the interdependence of the criteria is complex.

In the second type, of course, the establishment of the classification is only the first step. Thus, for instance, after the educational measurements have been classified, each class contains only students with very similar groupings of the values measured. The next step is to study each of these groups in order to determine the properties of each group. This is accomplished by discovering what properties, facilities, aptitudes, and limitations are held in common by all the members of a certain classification and by no other students in the same way. Such properties thus become associated with the "Standard Profile" of that particular classification. The discovery that some new individual possesses a profile belonging in that classification will identify him as having similar properties, facilities, aptitudes and limitations.

It is important to note that the system of indices of closeness of fit existing between the members which have been so classified gives complete evidence necessary to determine the mathematical inter-relations between the classes. To be sure, the actual properties of the various classes must be determined by observing members of each class. This observation, however, would give no evidence of the inter-relations existing between the classes. This inter-relation is determined from a mathematical analysis of the whole system of indices of closeness of fit, as obtained in the measurements made to classify the whole body of measurements.

Thus, the method not only classifies profiles, but furnishes complete mathematical material for determining the relationships between the classes so derived.

It is therefore an object of this invention to compare related data so that the best set of factors for a given situation may be obtained.

It is a more specific object of this invention to provide apparatus by which a series of punched data cards may be compared with a given punched data card to determine the closeness of the comparison of the various cards with the first mentioned card.

It is a further object of this invention to provide a pneumatic method of comparing punched data cards.

It is also an object of this invention to provide a photometric method of comparing punched data cards.

With the above and other objects in view, which will be apparent as the description proceeds, I have set forth my invention in the following specification, and have illustrated it in the accompanying drawings in which.

Referring to the accompanying drawings, and particularly Figs. 1–8 thereof, I have disclosed a pneumatic embodiment of my invention.

This comprises a box 30 having three compartments, an upper compartment 31, a middle compartment 32 and a lower compartment 33. Compartments 31 and 32 are separated by an airtight shelf 34, and compartments 32 and 33 are separated by an airtight shelf 35. The top compartment 31 is normally open at 36.

Air enters lower compartment 33 through a circular orifice 37, and passes into middle compartment 32 through a corresponding circular orifice 38, the same size as orifice 37, being drawn into compartment 32 through the suction created therein by an exhaust fan 40 mounted on shelf 35, and arranged in proximity to a large orifice 41 in the rear wall 42 of compartment 32.

Air entering upper compartment 31, as explained later, enters middle compartment 32 through a rectangular orifice 43 in shelf 34. The effective area of orifice 43 is controlled by a horizontal gate 44 provided with a triangular orifice 45. The gate 44 preferably comprises a flat metal slide 46, terminating in a short vertical riser 47, for reciprocation in a space in shelf 34. Gate 44 is provided with any convenient handle 50 having a scale 51 for registering with the front wall 52 of the box 30.

The relation of the pressures in the upper and lower compartments 31 and 33 is indicated by a manometer 53, of any suitable type.

Figure 22:
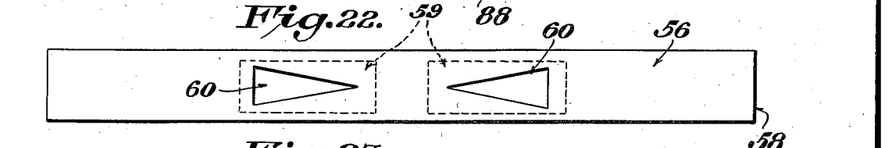
Fig. 22 is a plan view of a rail containing spaced triangular openings for cooperation with a profile card containing single rectangular openings.
Figure 23:
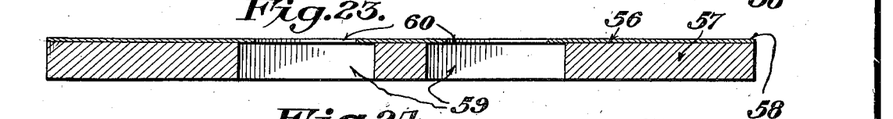
Fig. 23 is a longitudinal vertical section through Fig. 22.

At the sides of the top of the box 30, there are provided guides 54 and 55 to retain a plurality, in this case six, of movable rails 56 which, with profile cards described below, control the entrance of air into compartment 31. As shown in Figs. 22 and 23, these rails preferably comprise strips of wood 57, or any other suitable material, provided on their upper surface with a suitable protecting cover, such as the metal sheathing 58. In the embodiment shown in Figs. 1, 22 and 23, rails 56 are provided with a pair of triangular-shaped openings 60 with the apices arranged towards one another, but spaced apart a predetermined distance.

As shown in dotted lines in Fig. 22 and in full lines in Fig. 23, the body portion 57 below the metal sheathing 58 is provided with rectangular openings 59, which are appreciably larger than the triangular-shaped openings 60, in order that air and light passing through the triangular-shaped openings may not be restricted by the body of the rails.

The upper surfaces of rails 56 terminate in the plane of shoulders 61 on guides 54 and 55, which shoulders provide a convenient support for profile cards 62 of any suitable material, such as cardboard.

Figures 1, 7:
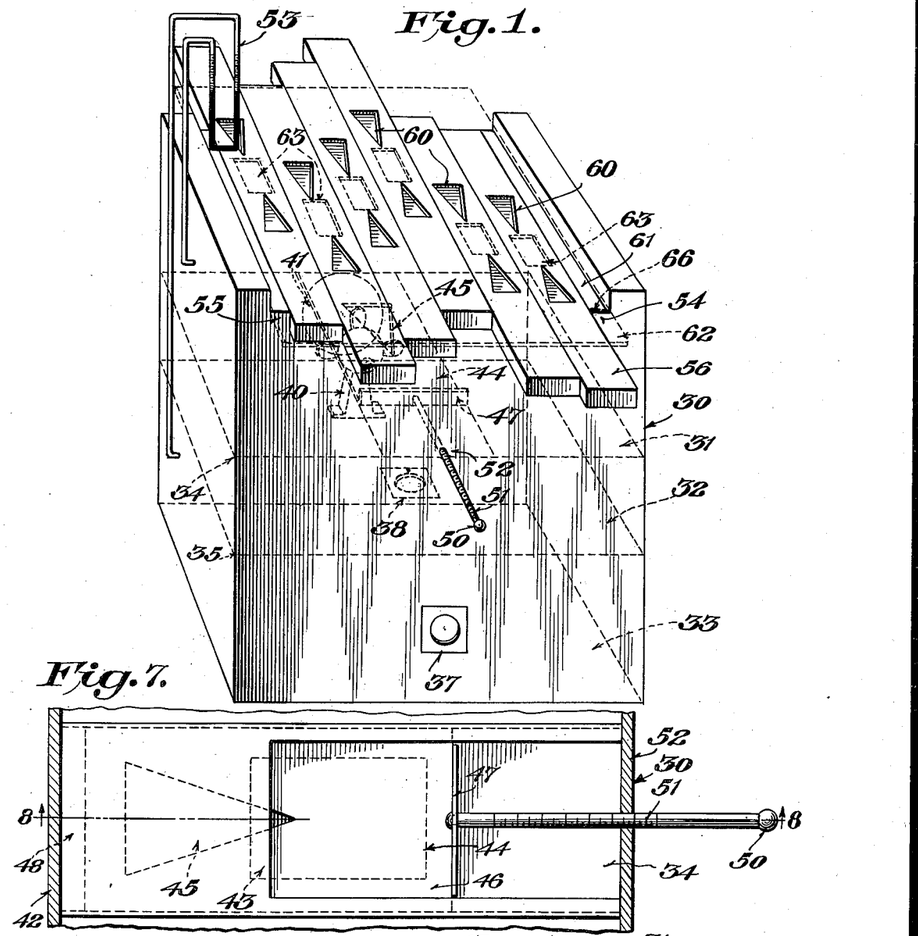
Figure 1 is a perspective view of a pneumatic embodiment of my invention.
Fig. 7 is a horizontal section on the line 7—7 of Fig. 3.
Figure 2:
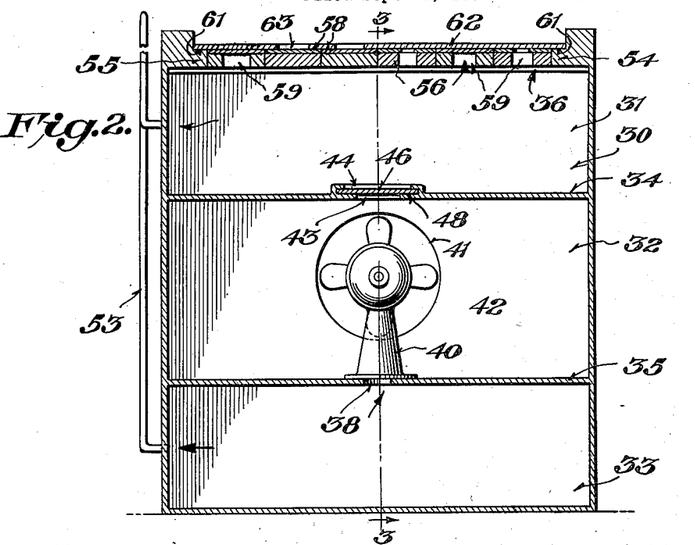
Fig. 2 is a transverse vertical section through Fig. 1.
Figure 3:
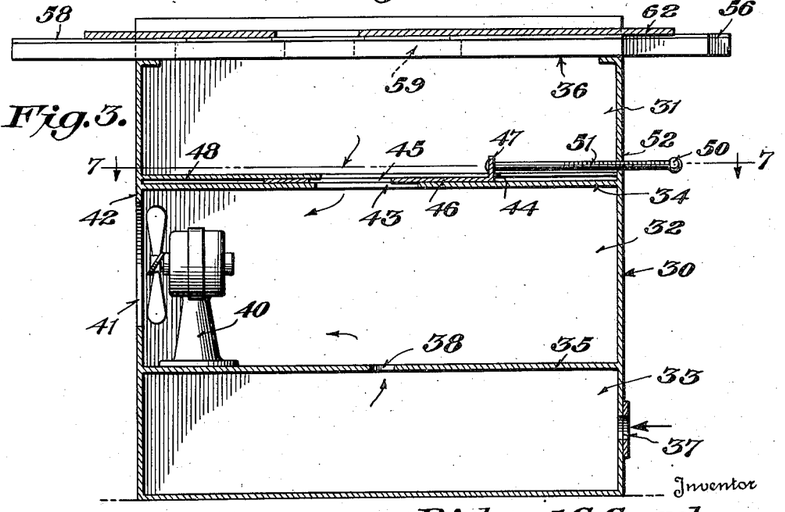
Fig. 3 is a longitudinal vertical section on the line 3—3 of Fig. 2.
Figure 4:
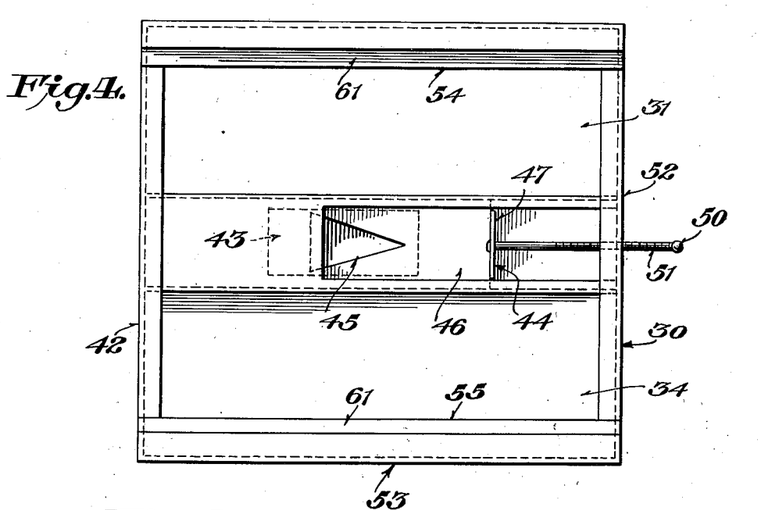
Fig. 4 is a plan view of Fig. 1 with the rails and profile card removed.
Figure 5:
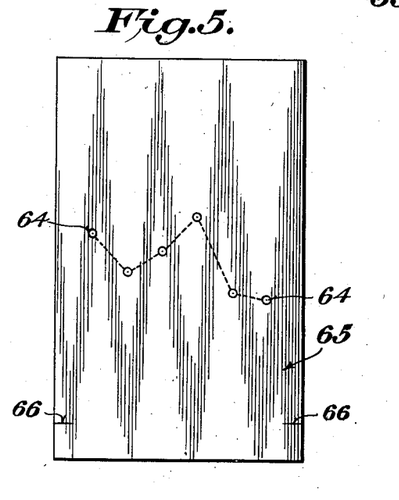
Fig. 5 is a plan view of a chart on which data is recorded to determine the location of the openings in the corresponding profile card.
Figure 6:
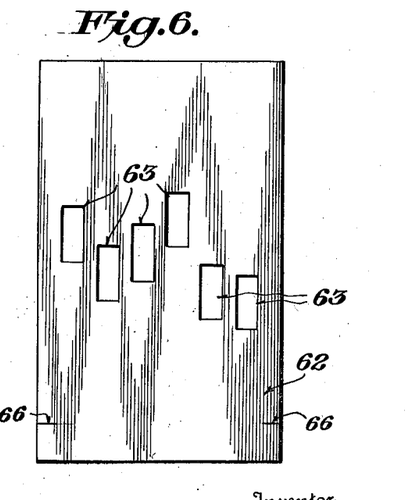
Fig. 6 is a plan view of a profile card corresponding to the chart shown in Fig. 5.
Figure 8:
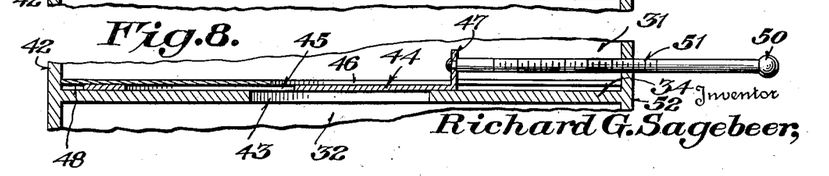
Fig. 8 is a vertical section on the line 8—8 of Fig. 7.

For use with the rails shown in Fig. 1, the profile cards 62 are preferably provided with a plurality, in this case six, of rectangular orifices 63 of equal size, which size corresponds to the spacing between the apices of the triangular openings 60 in the rails 56. The orifices 63 in the particular profile card 62 shown in Fig. 6 correspond to the data points 64 on a predetermined chart 65, the centers of the orifices 63 coinciding with the corresponding data points 64.

When my embodiment, just described, is to be used, the operator will observe that the reading of the two columns of the manometer is even before any card is inserted, because of the equal pressures in the upper and lower compartments 31 and 33. The operator then starts the fan 40, and inserts a profile card 62 with its scale mark 66 at the edge of guide rail 54, adjusting the rails 56 so that the orifices 63 are covered by the portions of the rails between the orifices 60. After this adjustment the rails are prevented from slipping in any desired manner, either by their inherent friction or by any suitable clamp or spring (not shown). The manometer reading now becomes unbalanced, because of the lower pressure in upper compartment 31 than in lower compartment 33, because air is prevented from going into compartment 31. The operator now replaces the first profile card with another profile card without changing the position of the rails but with its scale mark 66 at the edge of the guide rail 54, and adjusts the gate 44 until the two columns of the manometer are even. The reading on the scale 51 on the handle 50 of the gate 44 is noted, and this is the degree of the closeness of fit of the orifices 63 in the second profile card with the orifices in the first profile card. The second card is then removed and the remaining cards are each tested in the same way. The scale readings for the various cards tell the operator which profile cards, and hence which sets of data, most closely match the data on the first profile card.

Each chart 65 and corresponding profile card 62 are provided with marginal marks 66. When a mark 66 coincides with the end of the guide rail 54, the middle of the profile card 62 and the mean value of the six variables will be at the middle of the space above the rails 56.

These variables will preferably be expressed in terms of the standard deviations of the respective variables, as is done in the well-known T-scale frequently used in educational measurements. Where six variables are to be used, they will be based on six measurements which are called "raw scores". To convert these into T-scales, the following procedure is followed. The mean value of all scores is determined for each test. The deviation of each score from the mean of all the scores is next determined. Each deviation is squared, and the sum of the squared deviations is divided by the number of scores to give the "mean square of the deviations". The square root of the latter is known as the "Standard Deviation", and is the unit to which statistical measures are usually reduced. Each "raw score" in turn is divided by the standard deviation of all scores on that test. Each quotient is the number of standard deviations, or fraction thereof, above or below the mean, of that individual's score. The corresponding T-scale score is derived by representing all scores of zero standard deviation as 50 on this scale. Each unit above or below 50 represents one-tenth of a standard deviation. Thus, a score on this scale of 80 is three standard deviations above the mean of all the scores, and a score of 20 is three standard deviations below the mean.

With all scores, for all six tests, converted to this T-scale, the profile cards are prepared as follows:

The six scores for the first individual are averaged. The orifices are punched so that this average of the six scores is at the midpoints of the two guide rails 54 and 55 when the card is in its correct position. This correct position for the card is indicated when the marginal marks 66 coincide with the end of the guide rail 54.

Where desired, a small block or stop (not shown) may be provided at the rear end of the guide rail. Each card may then be inserted until it contacts with this stop without the necessity of bringing the mark 66 into coincidence with the end of the guide rail 54.

As noted above, the center of each rectangular orifice in a card will be a certain number of units (T-scale) above or below the mean of the six scores of the given data. The punching machine (described later) is provided with a scale having one hundred equally-spaced divisions. Each of these divisions is one-tenth of a standard deviation, and the complete scale therefore is the so-called T-scale. It is necessary to calibrate the scale 51 on the gate handle 50 to read in similar units. In order to do this, a second scale must be provided, which is an exact duplicate of the T-scale (discussed later) on the punching machine. A profile card 62 with its perforations 63 is placed above the rails. Each rail 56 is adjusted until the rectangular orifice 63 in the card 62 above that rail is exactly closed by the solid portion of that rail lying between the apices of the two triangular openings 60 in the rail, as described above. In this position no air can pass through any of the orifices. The card 62 is now displaced toward the operator until the mark 66 is one unit from the end of shoulder 54, as indicated by the duplicate T-scale. The handle 50 is now adjusted with the fan 40 running until the manometer arms 53 are at equal levels. This position on the handle 50 is calibrated as one unit. The card 62 is next displaced two units, a new balance is obtained by moving handle 50, and the new position is calibrated as two units, and so on until the whole scale 51 has been correctly calibrated.

If any other card 62 is now inserted instead of the one to which the rails have been set, and if the manometer 53 is rebalanced by resetting the handle 50, the calibrated scale 51 will now read in tenths of a standard deviation the disparity between the first profile card and the one inserted last.

While in the foregoing embodiment of my invention, I have disclosed rails 56 having spaced triangular orifices 60, and profile cards having single rectangular orifices 63, various other combinations of orifices may be utilized.

Figure 9:
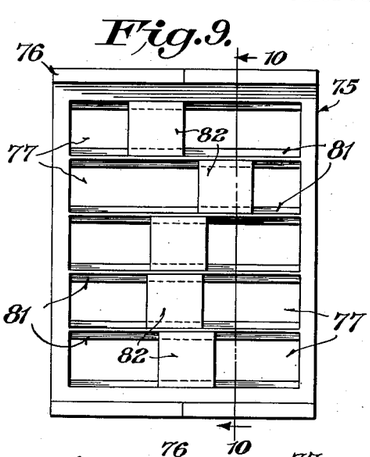
Fig. 9 is a plan view showing a modified form of construction having rectangular openings.
Figure 10:
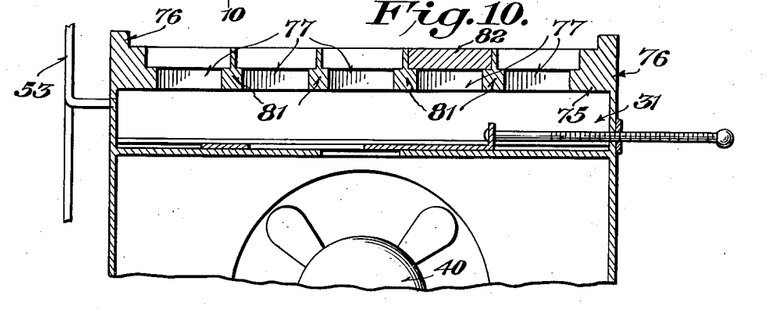
Fig. 10 is a transverse vertical section on the line 10—10 of Fig. 9 showing the block guides for the blocks of Fig. 9.
Figure 11:
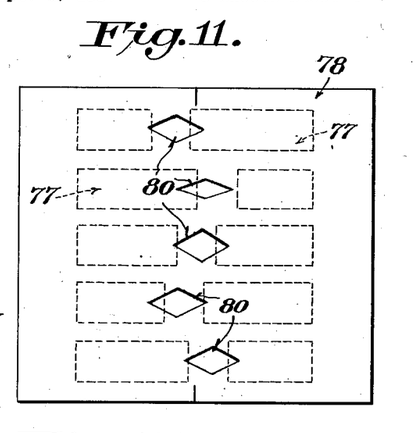
Fig. 11 is a plan view of a profile card provided with diamond-shaped openings superposed on a construction having rectangular openings.

As indicated in Figs. 9 and 10, for example, the top 75 of the upper compartment 31 may be provided with card guide rails 76 to guide profile cards 78 having diamond-shaped orifices 80 as shown in Fig. 11. In this embodiment of my invention, the top 75 also has a plurality of block guides 81 to support slidable blocks 82 which leave rectangular orifices 77 in top 75 on either side of the slidable blocks.

As shown in Fig. 11, the diamond-shaped orifices 80 may be made of varying widths when different "weightings" of the variables are desired, but the space between the ends of the corresponding rectangular orifices 77 must be the same as the length of the corresponding diamond-shaped orifice 80 in the profile card 78 so that the blocks 82 will close the diamond-shaped orifices in the card when they are exactly beneath them. Of course, where all of the variables are to have the same "weighting", the diamond-shaped orifices would have equal widths.

Figure 17:
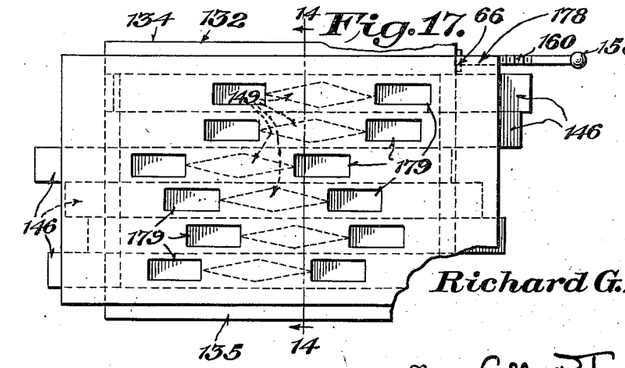
Fig. 17 is a plan view of the lower part of Fig. 13 showing the profile card and rails used therein.
Figure 20:
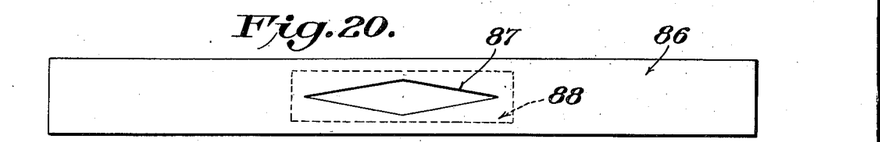
Fig. 20 is a plan view of a rail containing a diamond-shaped opening for cooperation with a profile card containing spaced rectangular openings.
Figure 21:
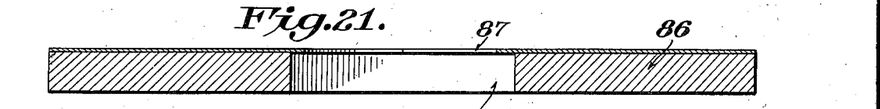
Fig. 21 is a longitudinal vertical section through Fig. 20.

As shown in Figs. 20 and 21 each rail 86 may be provided with a single diamond-shaped orifice 87 having an enlarged rectangular opening 88 below the top sheathing. With this type rail, the corresponding profile card will have pairs of spaced rectangular-shaped orifices, as shown in Fig. 17.

Figure 24:
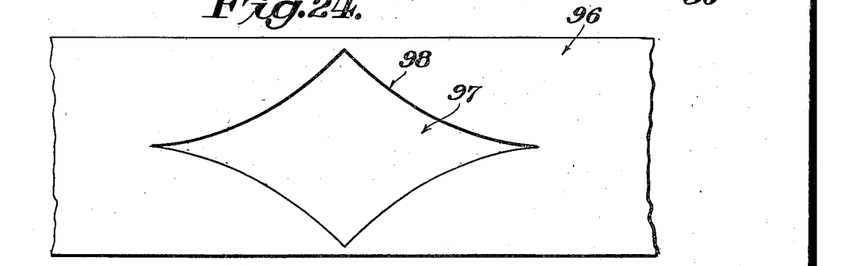
Fig. 24 is a plan view, on an enlarged scale, of a portion of a rail containing a concaved diamond-shaped opening.

Also, where desired, a rail 96 may have a diamond-shaped orifice 97 with concaved sides 98 as shown in Fig. 24. The corresponding profile card is shown in Fig. 17.

For the sake of compactness, the dimensions of the rails 56 and of the chamber 31 beneath the rails bear definite relations to the length of the rectangular orifices 63 used. The altitude of a triangular orifice 60 is preferably equal to the length of a rectangular orifice 63. The length of a diamond-shaped orifice 87, 97 or 149 is preferably twice the length of the rectangular orifice with which it is used. The maximum length of the scale used should always be at least twice the length of the rectangular orifice.

When one rectangular orifice 63 in the profile card is used with two triangular orifices 60 in the rail, as in Fig. 1, the length of the chamber 31 beneath the rails 56 must be at least five times the length of one rectangular orifice 63, and the rail 56 in this case must be at least seven times as long as the rectangular orifice 63. When these relationships are reversed, so that there are spaced triangular orifices in the profile card and a single rectangular orifice in each rail, the rail must be at least five times the length of the rectangular orifice, and the chamber 31 must be at least three times the length of the rectangular orifice.

When two spaced rectangular orifices 179 in the profile card are used with one diamond-shaped orifice 149 in a rail 146, as in Fig. 17, regardless of whether the diamond-shaped orifices are concave or straight, the chamber must be at least six times the length of a single rectangular orifice 179, and the rail 146 must be at least eight times the length of a single rectangular orifice 179. When these relationships are reversed, so that there are spaced rectangular orifices in each rail and single diamond-shaped orifices in each profile card, the rail must be at least eight times the length of a single rectangular orifice, and the chamber must be at least six times the length of a single rectangular orifice.

When single diamond-shaped orifices 80 in the profile card 78 are used with slidable blocks 82 in the top 75 of a compartment 31, as in Figs. 9–11, the blocks 82 must be of the same length as the length of the diamond-shaped orifices 80, and the block guides 81, which are the length of the interior of compartment 31, must be at least three times the length of the blocks 82.

For practical purposes, I have found that coefficients of closeness of fit with less than one per cent error are satisfactory. This is obtained by using a rectangle three inches long, with a six-inch scale divided into one hunded equal divisions. Smaller rectangles could be used where this degree of accuracy is not necessary. Similarly, where still greater accuracy is desired, this may be accomplished in well-known ways, such as by using verniers or reading lenses. The preferred width of rail, when six are used, is two inches. If the number of variables is more than six, each rail may be correspondingly narrower without loss of accuracy in the final coefficient of closeness of fit.

In the embodiment of my invention shown in Figs. 13–19, I have disclosed a photometric embodiment of my invention. This comprises a box 130, having an upper section 131 and a lower section 132, which are adapted to fit together by the engagement of a projecting rib 133 on section 131 between guide rails 134 and 135 on section 132. The rib 133 terminates in a plane above the shoulders 136, which are formed on the ribs 134 and 135 to provide a space 140 for a profile card as discussed below.

The upper section 131 comprises any desired number of light-projection compartments 137, in this case six of these compartments being shown. Each of these compartments is formed by parallel walls 138, but is open at both its top and bottom, and the walls of adjacent compartments, while spaced apart at their upper ends, come to a common line at their lower ends in order to bring the open bottom portions of the compartments closer together for registering with a plurality of rails 146, corresponding to that shown in Fig. 20, each of which is provided with a diamond-shaped orifice 149.

I provide a slidable lamp block 147 for each of the compartments 137, each said lamp block having a lamp 148 mounted therein in such a way as to throw the light downwardly into the corresponding compartment 137. The open upper ends of the various compartments 137 may be closed by a suitable cover (not shown).

The lower section 132 comprises a large compartment 151 and two smaller compartments 152 and 153. Compartment 151 is separated from compartments 152 and 153 by a sloping wall 154 extending from the top near one side of this section to the bottom thereof, and compartments 152 and 153 are separated by a light-proof shelf 155, which is provided with a suitable triangular orifice 156 that may be closed or uncovered by the operation of a gate 157 of the same type as gate 44 discussed above, except that gate 157 has no orifice therethrough. Gate 157 is provided with a handle 158 carrying a scale 160. Gate 157 operates in a space 161 provided in shelf 155. Compartment 152 is provided with a lamp 162 mounted on the front wall of that compartment. Its rear wall comprises a downwardly and inwardly sloping mirror 163 which is adapted to reflect light from lamp 162 through the triangular orifice 156 in shelf 155 when gate 157 uncovers orifice 156. This is reflected on to the white floor 164 of compartment 153 and back to a photoelectric cell 165 mounted on the under side of shelf 155.

Light from lamps 148 mounted in the compartments 137 of upper section 131 passes through the corresponding orifices 149 in rails 146 into main compartment 151, and is received on a sloping rectangular mat 166, which is preferably white, which reflects the light back to a photoelectric cell 167 mounted in the upper corner of compartment 151 substantially parallel to sloping rectangular mat 166.

Figures 13, 18, 19:
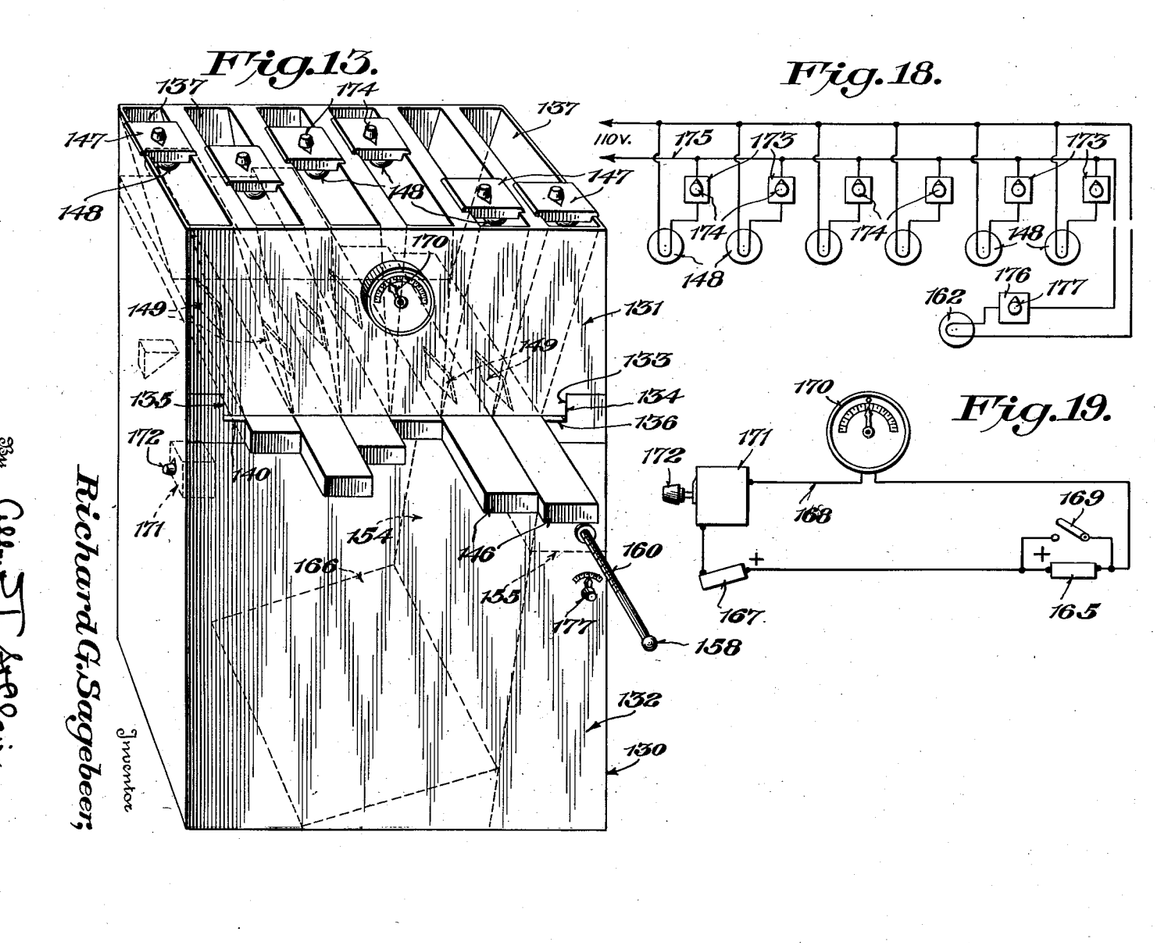
Fig. 13 is a perspective view of a photometric embodiment of my invention.
Fig. 18 is a diagrammatic view of the electrical circuit containing the rheostats for the individual lamps.
Fig. 19 is a diagrammatic view of the electrical circuit connecting the photoelectric cells.
Figure 14:
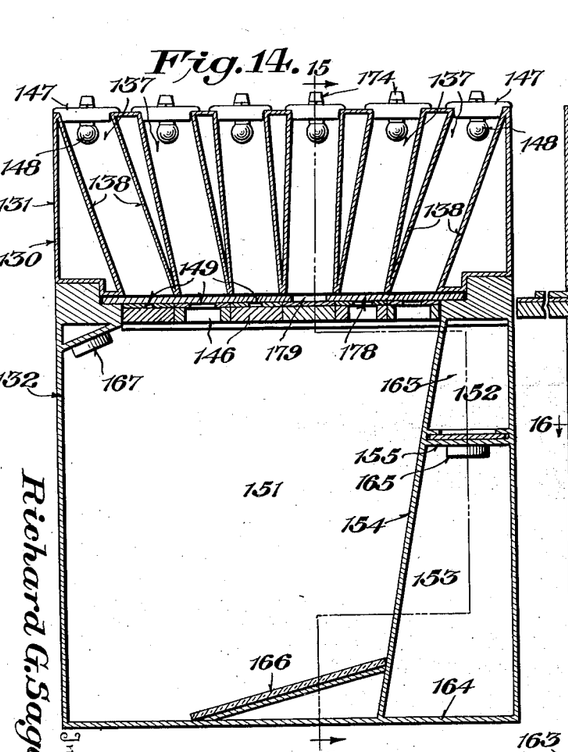
Fig. 14 is a transverse vertical section on the line 14—14 of Fig. 17.
Figure 15:
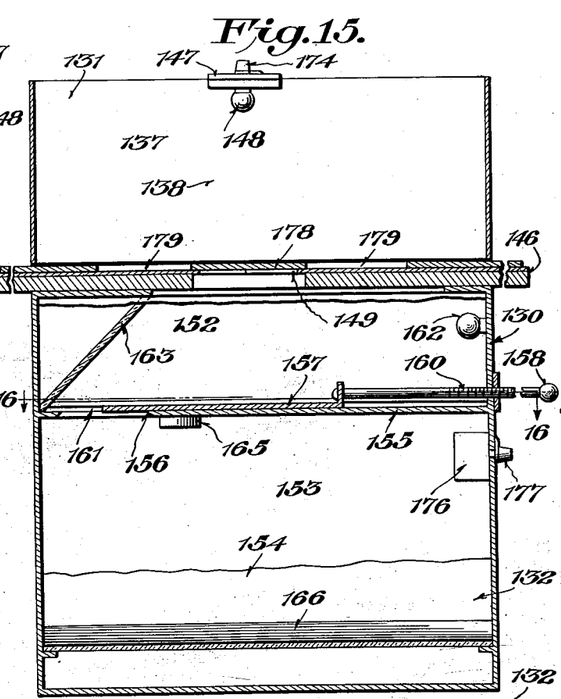
Fig. 15 is a longitudinal vertical section on the line 15—15 of Fig. 14.
Figure 16:
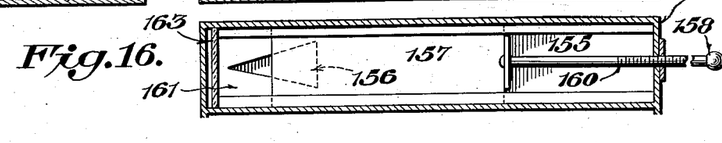
Fig. 16 is a horizontal section on the line 16—16 of Fig. 15.

Photoelectric cells 165 and 167 are connected in series in a circuit 168 with a switch 169 by means of which photoelectric cell 165 may be short circuited, as shown in Fig. 19, with a millivoltmeter 170 and a rheostat 171 provided with an adjusting knob 172. The photoelectric cells 165 and 167 are of opposite polarity so that with equal illumination upon them no voltage will be impressed on millivoltmeter 170. The variable rheostat 171 is used to protect the millivoltmeter until the blanace has been approximated.

The photoelectric cells 165 and 167 described here are preferably the so-called "dry copper oxide" type, which generate an electromotive force when illuminated. Any other type of photoelectric cell, such as the potassium cell which liberates charges into a vacuum when illuminated, could be used instead by providing the necessary equipment, such as batteries and amplifiers if necessary.

Each of the lamp blocks 147 is provided with a small rheostat 173 with an adjusting knob 174 to control the illumination furnished by each lamp 148. All of the lamps 148 and lamp 162 are connected in parallel in a circuit 175. Lamp 162 is controlled by a rheostat 176 provided with an adjusting knob 177.

These rheostats 173 are used to allow the various light rays from the lamps 148 to be adjusted to exact equality in cases where the lamps may not be of exactly equal intensities. These rheostats may also be used to apply various "weights" to the different variables if this becomes necessary for certain types of problems. The rheostat 176 permits adjustment of the scale reading 160 on the handle 158, in case small variations are to be made here. This scale 160 must have been previously calibrated by inserting a card 178, adjusting rails 146, then displacing the card small unit displacements and marking unit calibrations, to correspond to these unit displacements, on the handle 158, as described above for the calibration of the pneumatic embodiment.

When it is desired to operate my photometric embodiment, a profile card 178, provided with rectangular openings 179, as shown in Fig. 17, is inserted in the space 140 left between upper and lower sections 131 and 132, and rails 146 are adjusted until no light reaches photoelectric cell 167. Lamp blocks 147 containing the lamps 148 are then adjusted so that each lamp 148 is directly above the diamond-shaped orifice 149 in the corresponding rail 146 below the open lower end of that compartment 137.

The first profile card 178 is replaced by a second one, and the gate 157 is adjusted until the millivoltmeter 170 reads zero. The reading for this particular profile card is indicated by the reading on the scale 160, of handle 158, which is just visible beyond the front wall of section 132.

The second profile card is replaced by a third profile card and so forth, adjusting the gate 157 each time until the millivoltmeter 170 reads zero, and noting the reading on the scale 160. These scale readings tell the operator which profile cards, and hence which sets of data, most closely match the data on the first profile card.

The preferred height for the lower section 132 of my photometric embodiment is thirty-two inches. If this size is decreased, it becomes difficult to converge the beams of light from the various rails 146 at the center of the floor 166 of the section.

The various orifices 63, 80 and 179 in profile cards 62, 78 and 178, respectively, may be made therein in any desired way, as by the use of any suitable punching machine 200.

Figure 25:
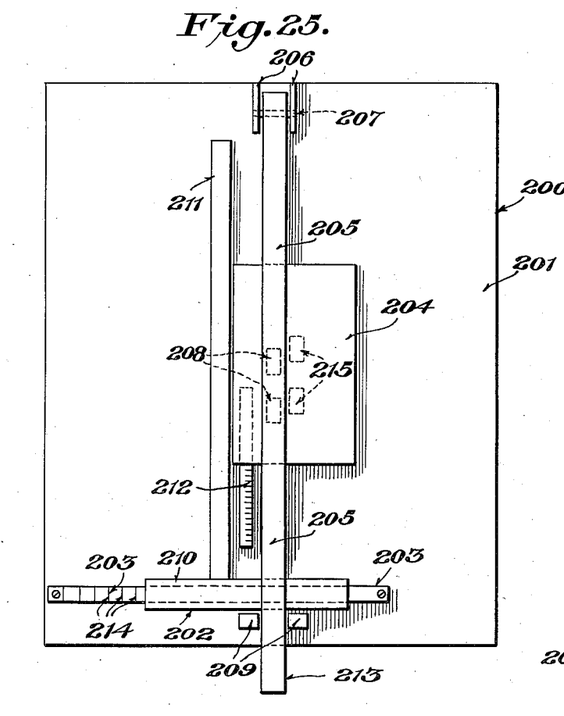
Fig. 25 is a plan view of a suitable punching machine.
Figure 26:
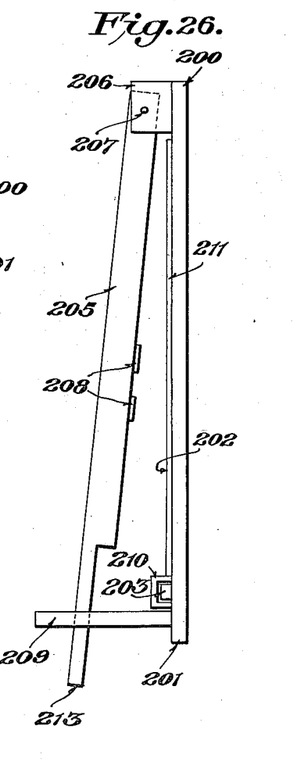
Figs. 26 and 27 are side and end elevations, respectively, thereof.
Figure 27:
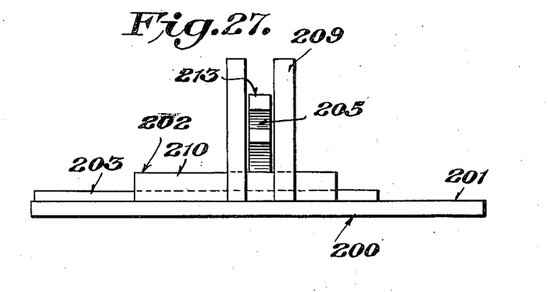

The latter comprises four essential parts: A table 201, a T-square 202 with a guide rail 203 for aligning a profile card 204, an arm 205 with knives 208 and guides 209, and a T-scale 212.

The table 201 has rigidly attached to it the guide rail 203 for the T-square 202, and also two blocks 206 carrying a bolt 207 upon which the arm 205 carrying the knives 208 is pivoted. The T-square has a grooved head 210 for sliding along the guide rail 203 and a blade 211 to align the profile card 204 under the knives 208. Guide rail 203 is provided with marks 214 to indicate the proper displacement of the card 204 for punching each pair of orifices 215. For the embodiments represented in Figs. 1, 6, 12 and 17, guide rail 203 would have six equally spaced marks 214 for the six punching positions required. The arm 205, which is of any desired material, such as wood, carries knives 208 designed to cut the desired shape of orifice 215 in the profile cards 204. In the drawings, two rectangular knives 208 are shown. When the handle 213 of arm 205 is depressed, the knives 208 are driven through the card. The exact vertical position at which the orifices will be punched is determined by the T-scale 212, the bottom edge of the card being aligned with the desired score on this scale before making each orifice. The two guides 209 prevent any lateral displacement of arm 205 during a perforating operation.

In use, the head 210 of the T-square 202 is set for the first position 214, the card 204 is placed against the right edge of the blade 211, and the lower edge of the card 204 is aligned with the first score on the T-scale 212. The arm 205 is depressed and the orifices made. The T-square 202 is next shifted laterally to the second position 214 on the guide rail 203, the card 204 is adjusted again to touch the blade 211 and the second score on the T-scale 212, and the orifices made, and so on.

All of the profile cards are provided with marginal marks 66 which must coincide with the end of the guide rail in order to center the mean value for the data recorded on that particular profile card in the space above the rails.

Figure 12:
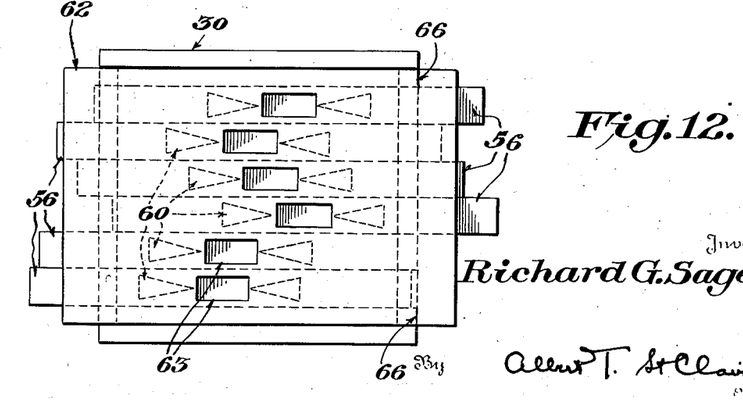
Fig. 12 is a plan view of a profile card having rectangular openings superposed on rails having spaced triangular openings.

As disclosed above, the shape of the orifices in the profile card must bear a suitable relation to the shape of the orifices in the rails used in conjunction with that profile card, but various combinations of these orifices may be used. As shown in Figs. 1 and 12, for example, single rectangular orifices 63 in profile card 62 may be used with spaced triangular orifices 60 in rails 56. As shown in Fig. 17, spaced rectangular orifices 179 in profile card 178 may be used with single diamond-shaped orifices 149 in rails 146.

Various other combinations may also be used. For example, each of these arrangements may be reversed, as by providing a profile card for Fig. 1 with spaced triangular orifices which cooperate with single rectangular orifices in the rails. Similarly, the diamond-shaped orifices in either the profile cards or the rails may be of the concave side type 97 shown in Fig. 24, and these concave side diamonds may replace the straight side ones, wherever desired. For instance, the profile card may be provided with two spaced rectangular orifices in conjunction with single concave diamond-shaped openings in the rails.

As also shown in Figs. 9, 10 and 11, the rails provided with orifices may be replaced with top members 75 provided with block guides 81 to receive slidable blocks 82 that leave rectangular orifices 77 on either side thereof, and profile cards 78 used in conjunction with the orifices 77 may have single diamond-shaped orifices 80.

It is always necessary, however, that the orifices and solid portions of the corresponding rails and profile cards be such that the solid portions between spaced orifices in one member can just completely cover the orifices in the other member, and that one set of orifices have similar sloping sides since my method operates on the principle of least squares, and the best measure of fit occurs when the sum of the squares is a minimum.

In all cases, the center of each orifice in a profile card, regardless of the shape of the orifice, or the center of the solid portion between two orifices, must coincide with the corresponding data point on the data chart.

Instead of the triangular or diamond-shaped orifices, any other type of rail may be used if it has the same property as is possessed by these orifices, namely of permitting a flow which increases in proportion to the square of the exposed height of the triangle. This same property could be provided in the photometric embodiment, for example, by using a so-called optical wedge instead of triangles or diamonds. Each optical wedge would form a window opening through a rail, and would be opaque at its midpoint but of decreasing opacity on either side of its midpoint. When the orifice in the card above the optical wedge is directly over the opaque center of the wedge, no light would pass through, but as the card is moved the light would increase proportionately to the square of the movement of the card. If this were done, small rectangular or circular holes could be used as orifices in the profile cards.

Instead of profile cards, a continuous strip of any suitable material, such as heavy paper, could be used. This would be carried on a roller, and unwound through the comparometer and wound simultaneously onto a second roller with the aid of any suitable indexing device. The successive profiles would be perforated through this strip of paper at intervals instead of being punched onto individual cards.

Either embodiment may be used to calculate the average of the ordinates represented by the orifices, without previous calculation. Thus, if a card with no mark 66 is placed above the rails, and if the rails have previously been set for any pattern whatever having its mean or average value at the exact center of the guide rails, the correct position for the mark 66 on the unmarked card will be found by moving card backward or forward until the indicator (manometer or millivoltmeter) is at a minimum reading. In this position the mark will be correctly placed on the point of the card which coincides with the end of the guide rail.

"Weighting" of the various variables can in any case be accomplished by having various rails for the various weightings, and by substituting new rails having predetermined different sized orifices to give new weighting values. The weighting is proportional to the base of the triangular orifice, or to the width of the diamond-shaped orifice. Doubling this width will double the flow through the orifice for any given setting. This is the only way to weight variables in the pneumatic embodiment, but in the photometric embodiment it may also be accomplished by the rheostats 173.

For the purpose of describing in detail one specific use of my comparometer, I will illustrate its use in connection with the prediction of stock market movements based on the way the market has acted at a previous time, when most of these factors were the same. For this purpose, if the cards were to be punched for these factors, this might be as follows:

(a) Volume of sales
(b) Steel production
(c) Electric power consumption
(d) Freight car loadings
(e) Bank clearings
(f) Brokers' loans Each of these factors would have a given column on the guide card, and from one end to the other of the card there would be in effect a graduated scale which would be different for each of these factors. Consequently, when the card was punched six times, once for each of these factors, at the position on the card corresponding to the magnitude of the given factor, the first card would record the given positions for each of these factors during the week the card represented. A printed or written notation on the card would give the actual stock market variations for the next week based on the Dow-Jones averages or a given stock or something else that might be desired. By making out one of these cards for each week in the year, and repeating this for two years, there would be obtained one hundred four cards. Of course, this might be carried out for any desired length of time. If this had been done for the last two years, then the probable action of the market for the current week might be foretold by finding out what happened in the preceding one hundred three weeks where these factors were substantially the same by comparing the card for the last week (which, of course, sets the stage for the current week) with each of the other one hundred three cards. When this was carried out by the use of the present apparatus, it might be found that there were two or three cards out of the one hundred three which fairly closely approximated the arrangement of these six factors on last week's card.

By looking at the indications of what the stock market did when these factors obtained previously, it would be reasonable to presume that, with the same set of factors for last week, the same change in the market would take place for the current week.

The procedure is the same for all of the examples mentioned. In classifying photographs, certain standard axes would be chosen. The distances of marginal points on the profile from one of these axes would be measured at regular intervals, and the measurements transferred to a card marked with that individual's identification. If the number of individuals is not too large, each card would be matched against each of the other cards in turn. If the "population" is excessively large, the same results will be obtained if a random sampling is made from the population and if the sampling is then subjected to analysis by this method. Statistical methods offer principles which can be applied to determine how large a sampling must be made to give any desired degree of accuracy in this procedure.

In the census analysis there might be many bases for classification. The classification might be made upon five measures or criteria such as:

(a) Number in family
(b) Amount of property owned
(c) Density of population at point of residence
(d) Total income of family
(e) Type of occupation The classification can obviously be made in any manner best suited to the study in hand, and sub-classes can be established, as for instance under types of occupations, in a manner similar to that used in deriving the main classification. If this were done, the classification numbers obtained from that analysis would become the measures incorporated in the profile of that family under "occupation".

In educational measurements, the variables chosen might be:

(a) Mental age or intelligence quotient
(b) Numerical aptitude
(c) Verbal aptitude
(d) Linguistic aptitude
(e) Space-concept aptitude
(f) Finger-dexterity measurement
(g) Coefficient of diversity of interests
(h) Coefficient of independence of effort On such a basis, the analysis would give certain classifications of patterns as well as the technical inter-relations between these classifications.

The actual properties of these various classes would then be determined from study of the relative success in various pursuits of these persons in later life. Study of measurements associated with mental cases would be treated in a similar manner.

In meteorology, the variables chosen would be the meteorological measurements that are most significant in prognosis of weather. Some of these trends, such as proximity of an existing "low area" to a characteristic and typical low-pressure track (lows move across the continent from west to east or up the coast along certain preferred tracks), would be subjected to separate classification or analysis into sub-classes. Finally, typical patterns of meteorological conditions would be determined by matching each individual pattern, say for one particular day, against all the other patterns. It would then be possible to discover what kind of weather would be most likely to follow after the appearance of any of these typical patterns. By means of the technical analysis of the inter-relations existing between these patterns, it would be possible to infer much about some pattern of an eccentric or unique character, even though it would not be close enough to any of the "standard patterns" already set up. After these inferences have been checked against the actual weather ensuing, this unique pattern would be included in the "standard patterns". It is interesting to note that there would be no difficulty in making a place for it in the classification. No rearrangement would be necessary. The nature of the system is such that each new pattern, as it presents itself for the first time, can be classified at once, and can be located at once in the files when the need arises.

From the above explanation it will be apparent that I have developed a method, and two preferred embodiments for carrying out that method, for quickly relating a series of variables to a plurality of other series of variables to determine the closeness of fit of these different series of variables.

It will also be apparent that this method, and these preferred embodiments, may be used to determine the relation between various series of variables for the proper classification of series of variables and for the prediction of the consequences of the occurrence of a given set of variables based on the consequences which followed a previous occurrence of that set of variables.

As many apparently widely different embodiments of this invention may be made without departing from the spirit thereof, it is to be understood that I do not limit myself to the foregoing embodiments or description except as indicated in the following patent claims:

I claim:

1. In a photometric device for comparing predetermined sets of data, the combination of a housing having two sets of compartments of two compartments each with a light source in one compartment of each set, an opening between the compartments of each set to permit light to pass from one to the other, a plurality of perforated rails arranged side by side to fill the space between the compartments of one set of compartments, a plurality of differently perforated profile cards, including a standard profile card, adapted to be placed one at a time in cooperative relation with the rails, means supporting said rails and card for relative adjustment to positions such that the rail and card openings are just out of registration, whereby no light passes from one compartment to the other, a millivoltmeter, a light sensitive cell in the compartment of each set not containing the light source, said millivoltmeter and cells being connected in an opposed series circuit for indicating the relative amounts of light in said compartments, and an adjustable shutter between the compartments of the second set for varying the size of the opening therebetween and restoring the millivoltmeter to its original reading when the standard profile card is replaced by another card with a resulting difference in registration of the rail and card openings and a change in the relative amounts of light in the two compartments.

2. The photometric device of claim 1, in which the adjustable shutter has a scale for indicating the amount it is moved.

3. The photometric device of claim 1, in which the light source in the first set of compartments comprises a separate light source for co-action with each rail, and means are provided for preventing light from each light source from reaching all other rails than the one with which it co-acts.

4. The photometric device of claim 1, in which the light source-containing compartment of the first set is divided into a plurality of sub-compartments, corresponding in number and alignment with the perforated rails, with a separate light source in each sub-compartment for transmitting light through the corresponding rail when the perforations in the rail and profile card are in registration.

5. The photometric device of claim 1, in which the light source-containing compartment of the first set is divided into a plurality of sub-compartments, corresponding in number and alignment with the perforated rails, with a separate light source in each sub-compartment for transmitting light through the corresponding rail when the perforations in the rail and profile card are in registration, and means for independently adjusting the intensities of the separate light sources.

6. The photometric device of claim 1, in which the openings in the rails and cards are such that the openings in one of these members are spaced triangular openings with the apices turned toward one another, and the openings in the other member are single rectangular openings, and in which the multiple openings are spaced apart a distance equal to the length of the single openings.

7. The photometric device of claim 1, in which the openings in the rails and cards are such that the openings in one of these members are spaced rectangular openings and the openings in the other member are single diamond shaped openings, and in which the multiple openings are spaced apart a distance equal to the length of the single openings.

8. A method for comparing predetermined sets of data to determine their closeness of fit to a given set of data, which comprises arranging a series of orifices in parallel relation in accordance with the given set of data in such a way that their relative positions determine the magnitudes of the items of data, arranging another set of orifices in relation to the first set so that they are just out of registration and the passage of flux through said first-mentioned orifices is blocked, substituting a different set of orifices arranged according to a different set of data for said first-mentioned set to permit the passage of an amount of flux, depending on the different arrangement of the orifices, adjusting a master orifice which is independent of said other orifices to change the amount of flux passing through it by an amount sufficient to compensate for the differences in the orifices until a zero reading is obtained on an indicating means which shows the relative magnitudes of the flux passing through the first-mentioned orifices and said master orifice, noting the amount said master orifice was adjusted, and successively substituting other sets of orifices arranged according to different sets of data for said second set to permit passage of different amounts of flux, adjusting the master orifice by an amount sufficient to compensate for the differences in the orifices until the zero reading is obtained on the indicating means for each of said successive sets of orifices, noting the amount said master orifice was adjusted each time, and comparing the amounts of said adjustments to determine the amounts of flux which passed through the various sets of orifices.

RICHARD G. SAGEBEER.